Patented June 26, 1945

2,379,297

UNITED STATES PATENT OFFICE 2,379,297

ESTERS OF ALPHA-CYANOALCOHOLS

Jesse Harmon and Charles Joseph Mighton, Wilmington, Del., assignors to E. I. du Pont de Nemours & Company, Wilmington, Del., a corporation of Delaware No Drawing. Application November 26, 1941, Serial No. 420,588

6 Claims. (Cl. 260—84.5)

This invention relates to esters of alpha,-beta-unsaturated carboxylic acids with monohydric cyanoalcohols, to polymers thereof and especially to polymers thereof with other polymerizable materials.

This invention has as an object the preparation of new esters. A further object of this invention is to provide a new and valuable class of polymeric materials. A still further object is to provide novel rubber-like polymers and more particularly synthetic rubbers which after vulcanization are characterized by outstanding resistance to swelling in oils or other organic solvents. Other objects will appear hereinafter.

These objects are accomplished by the present invention of esters, both monomeric and polymeric, of alpha,beta-ethylenically unsaturated carboxylic acids with cyano-alcohols, preferably monohydric cyanoalcohols.

The preparation of esters of alpha,beta-ethylenically unsaturated carboxylic acids with cyanoalcohols, e. g., the methacrylic or acrylic esters of cyanomethanol (formaldehyde cyanhydrin), alpha-cyanoisopropanol (acetone cyanhydrin), beta-cyanoethanol (ethylene cyanhydrin) and the like, may be carried out by reaction of the acid halides with the alcohols or by other esterification methods, e. g., the reaction of the acid or acid anhydride with the cyanoalcohol. Preferably the acid chloride is added slowly to a stirred, cold solution of the alcohol in a tertiary amine such as pyridine, triethylamine, etc. A vigorous exothermic reaction takes place and it is desirable to employ external cooling during the addition of the acid halide, the reaction mixture being maintained preferably at a temperature below 30° C. After the addition of the acid halide is complete and when no further heat is liberated, the mixture is warmed at 40–60° C. for approximately 40 minutes, cooled, and then extracted several times with water and a dilute acid solution to remove the organic base and its hydrohalide. The ester remaining is in turn extracted by an organic solvent such as ether, dried, stabilized with hydroquinone or other polymerization inhibitor, and finally distilled under reduced pressure. Other methods of preparation are described hereinafter. The esters are readily polymerized by heating and are converted thereby to hard, tough, transparent, glass-like solids. Catalytic agents such as organic or inorganic peroxides, persulfates, and perborates may be used or ultraviolet light may be employed. The polymerization may be conducted in bulk or in solution with inert organic solvents, or more preferably in aqueous suspension by the granulation or emulsion polymerization techniques.

Valuable conjoint polymerization products of these esters with other polymerizable vinyl-, or vinylidene-, including diene-type, materials may be prepared similarly. For example, polymers which possess excellent rubber-like properties are obtained with conjugated dienes such as 2-chlorobutadiene-1,3 (chloroprene) or butadiene. Polymerization of chloroprene alone or polymerization of chloroprene or butadiene with minor proportions of vinyl- or vinylidene-type materials results in valuable synthetic rubbers. Many of these rubber-like polymers and especially those based on chloroprene, possess a very important advantage over natural rubber in that they are much less affected by oils or solvents. However, for certain applications there is a need for rubber-like materials which possess even greater oil or solvent resistance. By the present invention it is possible to prepare a wide selection of rubber-like polymers which give vulcanizates having not only excellent tensile strength and extensibility but, in addition, outstanding resistance to oils and other solvents. Thus, polymers of either butadiene-1,3 or chloroprene with minor proportions (50% or less) of cyanomethyl methacrylate possess excellent rubber-like properties and their vulcanizates are markedly superior in oil and solvent resistance to both polychloroprene rubber and corresponding polymers of chloroprene or butadiene with simple unsubstituted alkyl methacrylates such as methyl methacrylate.

The more detailed practice of the invention is illustrated by the following examples, wherein parts given are by weight. There are of course many forms of the invention other than these specific embodiments.

Example I

This example illustrates the preparation and polymerization of cyanomethyl methacrylate.

Seventy-two and eight-tenths parts of methacrylyl chloride are added slowly to a stirred mixture of 40 parts of cyanomethanol (formaldehyde cyanhydrin), 2 parts of hydroquinone and 100 parts of pyridine, the temperature of the reaction mixture being maintained at 15–20° C. by external cooling. When addition of the chloride has been completed and no further heat is evolved, the mixture is warmed for 40 minutes at 50° C. The reaction product is then cooled, washed with water and dilute hydrochloric acid (water:acid, 5:1), extracted with ether, and finally dried over calcium chloride. The ether is evaporated and one part of hydroquinone is added to the straw colored, liquid ester before distilling. A yield of 36.5 parts of colorless cyanomethyl methacrylate (B. P. 91° C./15 mm.) is obtained. Analyses give the following results: C, 57.09%; H, 5.63%; N, 11.97%. For cyanomethyl methacrylate the theoretical values are: C, 57.6%; H, 5.6%; N, 11.20%.

A colorless, transparent, solid polymer is obtained on heating twelve parts of cyanomethyl methacrylate with 0.12 part of benzoyl peroxide for 1 hour at 55° C. After heating for six days at 55° C., the polymeric cyanomethyl methacrylate is a hard, glass-like material which softens at 83° C. The polymerization may be conducted in solution or in aqueous suspension by the emulsion or granulation techniques, and the resulting polymers may be molded readily into objects of various shapes.

*Example II*

This example illustrates the polymerization of cyanomethyl methacrylate with methyl methacrylate using the granulation polymerization technique.

A dispersion of a mixture of 9 parts of cyanomethyl methacrylate, 51 parts of methyl methacrylate, and 2 parts of benzoyl peroxide in an aqueous phase comprising 170 parts of water, 8 parts of a 2½% solution of the sodium salt of polymethacrylic acid, and 2 parts of disodium hydrogen phosphate is heated with rapid stirring ½ hour at 85-93° C. After filtering, the white granular polymer is washed with water and then dried. The yield is 58 parts (96% of the theory). The granules fuse at elevated temperatures (such as about 140-160° C.) under pressure and may be molded into objects of various shapes which, when cool, are colorless and transparent, hard and tough.

*Example III*

This example illustrates the preparation and polymerization of beta-cyanoethyl methacrylate.

A mixture comprising 85 parts of methacrylic acid, 106.5 parts of beta-cyanoethanol (ethylene cyanhydrin), 200 parts of dry benzene, 2 parts of hydroquinone, 5 parts of concentrated sulfuric acid, and 3 parts of para-toluenesulfonic acid is heated at reflux until water no longer distills as a binary with benzene, the binary being continuously separated, the water being discarded and the benzene returned to the reaction vessel. The resulting product is washed with a 5% solution of sodium hydroxide and finally with water to remove unreacted methacrylic acid and beta-cyanoethanol. After drying over calcium chloride, the benzene is removed under reduced pressure. Beta-cyanoethyl methacrylate (57 parts) distills as a clear, colorless liquid boiling at 100° C. at 2 mm. pressure. Analyses give the following results: C, 60.07%; H, 6.83%; N, 9.35%. Theory: C, 60.43%; H, 6.47%; N, 10.07%. The ester may also be prepared by reaction of methacrylyl chloride with beta-cyanoethanol in pyridine as in Example I.

A sample of this ester when heated with 1% of benzoyl peroxide at 55° C. polymerizes rapidly to a clear, colorless, hard, glass-like solid.

*Example IV*

This example illustrates the preparation and polymerization of alpha-cyanoisopropyl methacrylate.

To a stirred solution of 51 parts of alpha-cyano-isopropanol (acetone cyanhydrin) in 79 parts of pyridine cooled to 8-10° C. is added 63 parts of methacrylyl chloride during the course of 1 hour. The mixture is then stirred and warmed in a water bath at 70° C. for an additional hour. After cooling, it is diluted with several volumes of water and an excess of 20% sodium hydroxide solution is added. The mixture is extracted with ether, the ether solution is washed with water, dried with magnesium sulfate, filtered, and the ether is evaporated under reduced pressure. The cyanoisopropyl methacrylate which boils at 73-77° C. under 4 mm. pressure distills as a clear, essentially colorless liquid. Analysis of the ester gives the following results: N, 9.41% (theory 9.16%); refractive index $n_D^{25}$, 1.4305.

A solution of 8 parts of α-cyanoisopropyl methylate, prepared as above, in 72 parts of methanol containing 0.1 part of benzoyl peroxide is heated at 65° C. for 3 days. The polymeric ester separates as a syrup which solidifies as soon as the mixture is cooled. The methanol is decanted and the resin is dried at 100° C. for 2 hours. The polymer after cooling is a hard, essentially colorless, glass-like solid. It is soluble in acetone, ethyl acetate, and dioxan, and insoluble in ethanol and toluene.

*Example V*

This example illustrates the preparation of a rubber-like polymer of butadiene with cyanomethyl methacrylate.

Thirty-five parts of butadiene, 15 parts of cyanomethyl methacrylate, and 5 parts of carbon tetrachloride are emulsified in an aqueous phase comprising 16 parts of a 25% solution of N-hydroxypropyl-C-cetylbetaine, 1.7 parts of a 30% solution of the sodium salt of a sulfonated naphthalene-formaldehyde condensation product, 44 parts of water, 0.3 part of acetic acid, and 0.5 part of ammonium persulfate. The emulsion is heated 10 hours at 60° C. in a sealed glass vessel which is rotated end over end in a constant temperature bath. To the rubber-like latex so formed is added 5 parts of a 25% aqueous dispersion of a 55:45 mixture of phenyl-alpha-naphthylamine and diphenylamine. The latex is coagulated with brine and alcohol and the coagulum is washed with water on a corrugated rubber mill until free of soap, and finally dried on a warm, smooth rubber mill. Thirty-six and two-tenths parts of a soft, pliable and rubber-like polymer is obtained. A nitrogen analysis shows that 38.2% by weight of the polymer is cyanomethyl methacrylate. Upon compounding the polymer (10 parts) in the usual manner with carbon black (5 parts), sulfur (0.15 part), high boiling phenolic softener (0.3 part), paraffin wax (0.15 part), stearic acid (0.2 part), zinc oxide (0.5 part), and benzothiazyl dimethylsulfinimide accelerator (0.13 part) and after curing for 30 minutes at 131° C., an elastic, rubber-like vulcanizate is obtained which possesses a tensile strength of 2810 lbs./sq. in. at 325% elongation. After immersion in kerosene for 48 hrs. at 100° C. the vulcanizate exhibits only 32.6% increase in volume. The corresponding vulcanizate of a corresponding polymerizate of butadiene with methyl methacrylate exhibits approximately 110% increase in volume under the same conditions.

*Example VI*

This example illustrates the preparation of a polymerizate of chloroprene and cyanomethyl methacrylate.

Sixty parts of chloroprene and 15 parts of cyanomethyl methacrylate are emulsified with a solution of 4.6 parts of a 65% solution of the sodium salt of sulfated oleyl acetate, 0.75 part of the sodium salt of a sulfonated naphthaleneformaldehyde condensation product, 0.75 part of sodium p-toluenesulfinate, 0.41 part of concentrated hydrochloric acid, and 167 parts of water. The emulsion is maintained at 40° C. for 1 hour and 20 minutes by warming or cooling as required. The rubber-like latex so formed is then stabilized with 1.5 parts of a 50% aqueous dispersion of a 55:45 mixture of phenyl-alpha-naphthylamine and diphenylamine and also with 6 parts of a 25% aqueous dispersion of tetraethylthiuram disulfide. Upon coagulation of the latex with brine and alcohol and after washing the coagulum with warm and cold water on a corrugated rubber mill, and finally after drying on a warm smooth rubber mill, 71 parts of a soft, coherent, plastic, rubber-like polymer is obtained. During the drying operation 0.7 part of phenyl-beta-naphthylamine and 0.7 part of tetramethylthiuram disulfide are incorporated with the polymer. A nitrogen analysis shows that 19.3% by weight of the polymer is cyanomethyl methacrylate. The polymer is compounded in the usual manner as follows:

| | Parts |
|---|---|
| Polymer | 10 |
| Magnesium oxide | 0.4 |
| Zinc oxide | 0.5 |
| Carbon black | 3.6 |

After curing for 30 minutes at 145° C. a pliable, elastic, rubber-like vulcanizate which exhibits a tensile strength of 3350 lbs./sq. in. at 450% elongation is obtained. On immersion in kerosene for 48 hours at 100° C., the vulcanizate shows only 34% increase in volume, whereas corresponding vulcanizates of a corresponding polymerizate of chloroprene and methyl methacrylate or of a polychloroprene rubber exhibit approximately 65% increase in volume under the same conditions.

Conjoint polymerization of chloroprene with beta-cyanoethyl methacrylate likewise results in excellent synthetic rubbers of improved oil resistance. Thus, the vulcanizate of a polymer containing 14.1% of beta-cyanoethyl methacrylate possesses a tensile strength of 3950 lbs./sq. in. at 400% elongation. This vulcanizate exhibits only 33.5% increase in volume after immersion in kerosene for 48 hours at 100° C.

This invention is generic to esters of any alpha,beta-ethylenically unsaturated carboxylic acid with any cyanoalcohol. Monohydric cyanoalcohols are prefered and alphacyanoalcohols of the general formula

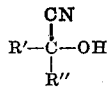

wherein R' and R'' are hydrogen or alkyl, cycloalkyl, heterocyclic, alkenyl, aryl, aralkyl or aralkenyl radicals are particularly valuable for the purposes of this invention in view of their low cost and ease of preparation. The radicals R and R' may also contain atoms and atomic groups such as —O—, —S—, —SO—, —SO2—, —CONH—, —CO—O—, —NH—, N-hydrocarbon, etc. Monohydric cyanoalcohols wherein the cyano and hydroxyl groups are attached to hydrocarbon radicals are particularly preferred. The alpha-cyano alcohols, which are commonly referred to as cyanhydrins, may be prepared readily by reaction of hydrogen cyanide with aldehydes or ketones. Examples of such alcohols are, among others, the cyanhydrins of formaldehyde, acetaldehyde, propionaldehyde, butyraldehyde, isobutyraldehyde, heptaldehyde, benzaldehyde, cinnamaldehyde, furfuraldehyde, cyclohexylaldehyde, phenyl acetaldehyde, acrolein, crotonaldehyde, phenylpropionaldehyde, acetone, methyl ethyl ketone, diethyl ketone, dipropyl ketone, diisopropyl ketone, methyl vinyl ketone, methyl isopropenyl ketone, mesityl oxide, acetophenone, furfural acetone, benzal acetone, cyclohexanone, acetothienone, phenylsulfoxide acetone, 2-phenylsulfobenzophenone, N-methylamide of terephthalaldehydic acid, ethyl acetoacetate, beta-ethylamino-propionaldehyde and methylisobutylamino acetone. However, the invention is not limited to esters of alpha,beta-ethylenically unsaturated carboxylic acids with alpha-cyanoalcohols only. The esters obtained with other cyanoalcohols in which the CN group is removed from the carbinol group by one or more carbon atoms are also valuable. Examples of such alcohols are 2-cyanoethanol (ethylene cyanhydrin), 2-cyano-1-propanol, 3-cyano-1-butanol, 4-cyano-1-butanol, 5-cyano-1-pentanol, 2-methyl-2-cyanomethyl ethanol, 2-cyanocyclohexanol, 1-cyanomethyl-2-chloroethanol, and the like. Polyhydric cyanoalcohols and cyanoalcohols having more than one cyano group such as 1-cyano-1,3-dihydroxybutane, 1-cyano-1,2,3-trihydroxypropane, 2,4-dicyano-2,4-dihydroxypentane, 1,2-dicyano-1,2-dihydroxybutane, sym. diphenyl dicyanoglycol, 1,2-dicyano-2-hydroxypropane, 1,3-dicyano-3-hydroxybutane, 1,2-dicyano-1-hydroxycyclohexane, and 1,1-dicyanoethanol are also operable according to this invention.

The invention is generic to esters of cyanoalcohols with any alpha,beta-ethylenically unsaturated carboxylic acid including methacrylic, acrylic, alpha-chloroacrylic, beta-phenylacrylic, beta-furylacrylic, maleic, fumaric, methylmaleic, chloromaleic, methylfumaric, chlorofumaric, itaconic, crotonic and sorbic acids and the like. The cyanoesters of acrylic or methacrylic acids are preferred particularly for the preparation of valuable polymers and copolymers.

The esters of this invention may be prepared by various means. The acid and alcohol may be reacted directly, preferably in the presence of an acid catalyst such as hydrochloric acid, sulfuric acid, para-toluenesulfonic acid or the like as is illustrated in Example II. Esters of alpha-cyanoalcohols are often most readily prepared by reaction of the acid halides, particularly the acid chlorides, with the cyanoalcohols, preferably in solution with a tertiary organic base such as pyridine. Other well known methods of esterification, such as reaction of the cyanoalcohol with the acid anhydride, or the nitrile may be employed. The cyanoesters may be prepared by ester interchange of cyanoalcohols with simple alkyl, e. g., methyl or ethyl, esters of the alpha,beta-unsaturated carboxylic acids.

As illustrated in the foregoing examples, polymerization of the esters of this invention alone or with other polymerizable materials may be effected by heating in bulk, in solution or in emulsion. The polymerization may be accelerated by irradiating with ultraviolet light or by incorporating in the polymerization system organic or inorganic peroxides, perborates or persulfates such as benzoyl peroxide, acetyl peroxide, acetyl benzoyl peroxide, hydrogen peroxide, ammonium-, potassium- or sodium-persulfate, sodium perborate, and the like. The temperature of polymerization may be varied over wide limits but usually temperatures within the limits of 5° C. and 100° C. are preferred; still more preferred are temperatures between 30 and 60° C. The pressure at which the polymerization is conducted likewise may be varied over wide limits with satisfactory results. The choice of temperature and pressure depends to some extent upon the particular monomer or mixture of monomers employed and the results desired. In most instances, particularly with monomers whose boiling points are above the chosen temperature of polymerization, it is most satisfactory to work at atmospheric pressure, and open or sealed reaction vessels may be employed as desired. For the preparation of polymers with relatively low boiling materials such as butadiene-1,3, vinylidene chloride, and the like, it is desirable to conduct the polymerization in sealed reaction vessels and at superatmospheric pressures which are dependent at least in part upon the temperature employed. Also applicable are subatmospheric pressures, although in general such pressures offer no particular advantages.

For most purposes, and especially for the preparation of rubber-like polymers with butadienes, it is preferable to conduct the polymerization in an aqueous emulsion. Any substance which when dissolved in water is capable of forming an emulsion of the polymerizable monomers may be employed. Examples of such agents are, among others, the alkali metal salts of oleic acid, stearic acid and palmitic acid, salts of long chain amines with organic or inorganic acids such as octadecylamine hydrochloride and corresponding salts of cetyl-, dodecyl- and tetradecyl-amines, sodium rosinate, the sodium salt of sulfated oleyl acetate, sodium cetylsulfate, sodium isopropyl-naphthalenesulfate, N-stearylbetaine, N-cetylbetaine, N-hydroxypropyl-C-cetylbetaine, cetyl p-dimethylaminobenzoate, and the like. Usually a 2–4% solution of the emulsifying agent in water is satisfactory but, depending on the emulsifying properties of such agents in relation to the particular monomers employed, stronger or weaker solutions, for example 0.02–10%, may be desirable. The polymerization may be carried out in such a manner as to give a granular product. Dispersing agents which may be employed specifically for this purpose are, among others, a polymer prepared from 75% of methacrylic acid and 25% of methyl methacrylate which has been neutralized to a pH of 7–8, sodium celluloseglycolate, sodium starchglycolate, soluble starch, partially hydrolyzed polyvinyl acetate, various gums such as gum tragacanth, sodium alginate, and the like. Usually 0.1%–1% solutions of such granulation agents are suitable, although in this case also the most satisfactory concentration depends to some extent on the dispersing properties of such agents in relation to the polymerizable monomers. The emulsion or granular polymerizations may be carried out under essentially neutral, acid or alkaline conditions. When the emulsion or granulation technique is employed, it is usually desirable, especially with the latter, to agitate the dispersions by means of shaking or rapid stirring.

By polymerization of the cyanoesters of alpha, beta-unsaturated carboxylic acids alone and especially by polymerization with other polymerizable materials, a wide selection of novel and valuable products may be prepared. Among the various vinyl-or vinylidene-type materials which may be employed for polymerization with such esters are vinyl halides such as vinyl chloride and vinyl bromide, vinyl esters such as vinyl acetate, vinyl formate and vinyl benzoate, vinylidene halides such as vinylidene chloride and vinylidene bromide, acrylic and methacrylic acids and their derivatives such as the methyl, ethyl, propyl, butyl, isobutyl, hexyl, and octyl esters, their anhydrides, nitriles, amides, halides, and N-substituted amides, alpha-chloroacrylic acid and its corresponding esters, nitrile, halides, amides, and N-substituted amides, styrene, and vinyl ketones such as methyl vinyl ketone, methyl isopropenyl ketone, benzalacetone and the like. Other modifications include polymerization in the presence of film forming materials including paint or varnish adjuncts such as cellulose derivatives and other natural or synthetic resins, drying oils and the like.

Particularly valuable in view of their excellent rubber-like properties are the polymers obtained when the vinyl or vinylidene compound is a conjugated diene, e. g., butadiene-1,3, 1-methylbutadiene-1,3, 2-methylbutadiene-1,3, 2,3-dimethylbutadiene-1,3, 1-phenylbutadiene-1,3, 1-cyanobutadiene-1,3, 2-cyanobutadiene-1,3, 2-chlorobutadiene-1,3, 2-bromobutadiene-1,3 and the like. Of these dienes, butadiene-1,3, 2-methylbutadiene-1,3, and especially 2-chlorobutadiene-1,3 are preferred. The polymerizable vinyl and vinylidene compounds which may be employed include generically those having the generic formula

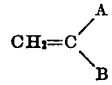

wherein A is hydrogen, halogen or a hydrocarbon radical and B is halogen or an organic radical containing a carbon atom joined to another atom by a plural bond, the carbon atom being removed from the $H_2C=C=$ radical by not more than one atom. Synthetic rubber-like materials may be prepared by polymerization of one or more cyano esters with one or more conjugated dienes in the presence or absence of other polymerizable or nonpolymerizable materials. Generally, the most satisfactory polymers with respect to rubber-like properties are obtained when the polymerization is carried out in an aqueous emulsion, although other polymerization techniques may be employed if desired. When the emulsion technique is employed the concentration of the polymerizable monomers in the emulsion may be varied considerably with satisfactory results, but in most cases a concentration of 10–50% based on the total emulsion is preferred. The polymerization may be conducted at temperatures of 5–100° C., although temperatures of 30–60° are usually preferred. Any emulsifying agent such as those mentioned above may be employed. The properties of such polymers depend to some extent upon the polymerization conditions and especially upon the particular diene and ester employed and the initial monomer ratio of diene to ester. In general, polymers which exhibit the most satisfactory rubber-like properties are obtained when no more than 50%, and preferably less than 50%, by weight of the total polymerizable material is ester. With butadiene-1,3 or 2-methyl butadiene-1,3, a monomer mixture in which 15–40% by weight of the total is ester is preferred for the production of polymers which give vulcanizates having good rubber-like properties in addition to excellent oil and solvent resistance. With chloroprene on the other hand, polymerization of mixtures comprising relatively small amounts (1-5%) of the cyanoester results in products which exhibit excellent rubber-like properties. The latter exhibit improved oil resistance compared to polychloroprene rubbers, but for applications which require rubbers of outstanding oil and solvent resistance, polymers obtained by polymerization of monomer mixtures in which 10-40% of the total is ester are preferred. This invention is not restricted, however, to rubber-like polymers of cyanoesters of alpha,beta-unsaturated acids with butadienes. Novel products which are useful in applications other than those of synthetic rubbers may be prepared by polymerization of a mixture of one or more butadienes with one or more cyanoesters in which the nonbutadiene component is present in major proportion. As the concentration of ester in the polymerizable monomer mixture is increased above 50%, the products become harder and less rubber-like until finally hard, tough, resinous materials are obtained. Such polymers may be hardened and toughened further by vulcanization in essentially the same manner as the more rubber-like polymers. Modifying agents which tend to accelerate polymerization and/or promote the formation of more plastic polymers with butadienes may be added to the polymerization mixtures. Sulfur, sulfur dioxide or hydrogen sulfide as disclosed in U. S. Patent 2,163,250, and organic modifying agents as disclosed in U. S. Patents 2,227,517; 2,227,518 and 2,227,519 may be employed with chloroprene conjoint polymerization products. Polymers of the esters of this invention with butadiene-1,3 may be modified by the use of sulfur, by compounds containing two or more chlorine atoms on the same carbon atom, or by certain mercaptans. Polymerization catalysts may also be employed, although in many cases, particularly with chloroprene, such catalysts are not necessary. When the polymerization has proceeded as far as is desired, materials having an antioxidant and/or stabilizing action such as phenyl-alpha-naphthylamine or phenyl-beta-naphthylamine and tetralkylthiuram disulfides may be added to the mixtures. These substances tend to stop further polymerization in emulsion and to prevent oxidation and degradation of the polymers during subsequent treatment. Coagulation of the polymers from the emulsions may be effected by any of the commonly employed methods such as by the addition of aqueous solutions of sodium chloride, magnesium sulfate or aluminum sulfate, by the addition of acids, bases or alcohols, or by freezing.

Drying, milling, compounding and curing of the polymers can be carried out by the usual methods employed for natural rubber or other synthetic rubbers. Plasticizing agents such as chlorinated naphthalene, chlorinated paraffin wax or any of the usual rubber or synthetic rubber plasticizers may be incorporated in the emulsions with the monomers or with the polymers during compounding.

The cyanoesters of alpha,beta-unsaturated carboxylic acids described herein and especially their polymers are useful in a wide selection of applications. The resinous polymers obtained by polymerization of such esters alone or with other polymerizable non-diene vinyl- or vinylidene-type compounds are in general hard, transparent, glass-like solids which may be formed into objects of various shapes either during the polymerization or afterwards by molding, sawing, drilling, filing, turning, etc. The tougher and more pliable polymers in particular may be formed into foils or films by casting from solution or by hot pressing. Solutions of these resinous materials may be employed for coating and impreganting compositions and as textile sizes. The rubber-like polymers obtained with butadienes are valuable as substitutes for natural rubber and are highly preferred to natural rubber in many applications which require a high degree of oil or solvent resistance.

The above description and examples are intended to be illustrative only. Any modification of or variation therefrom which conforms to the spirit of the invention is intended to be included within the scope of the claims.

What is claimed is:

1. A polymerizate of an alpha,beta-ethylenically unsaturated aliphatic carboxylic acid ester of an alpha-cyanoalcohol with a polymerizable conjugated butadiene.

2. A polymerizate of an alpha,beta-ethylenically unsaturated aliphatic carboxylic acid ester of an alpha-cyanoalcohol with 2-chlorobutadiene-1,3.

3. A polymerizate of an alpha,beta-ethylenically unsaturated aliphatic carboxylic acid ester of an alpha-cyanoalcohol with butadiene-1,3.

4. A polymerizate of an alpha-beta-ethylenically unsaturated aliphatic carboxylic acid ester of an alpha-cyanoalcohol with 2-methylbutadiene-1,3.

5. A polymerizate of cyanomethyl methacrylate with 2-chlorobutadiene-1,3.

6. A polymerizate of alpha-cyanoisopropyl methacrylate with butadiene-1,3.

JESSE HARMON.
CHARLES JOSEPH MIGHTON.